United States Patent
Kishi et al.

(10) Patent No.: US 7,600,073 B2
(45) Date of Patent: Oct. 6, 2009

(54) CACHE DISK STORAGE UPGRADE

(75) Inventors: Gregory Tad Kishi, Oro Valley, AZ (US); Jonathan Wayne Peake, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 433 days.

(21) Appl. No.: 11/535,253

(22) Filed: Sep. 26, 2006

(65) Prior Publication Data

US 2008/0077735 A1   Mar. 27, 2008

(51) Int. Cl.
*G06F 12/06* (2006.01)

(52) U.S. Cl. .................................. 711/113; 711/172

(58) Field of Classification Search ............. 711/111, 711/112, 113, 117, 118, 170, 171, 172
See application file for complete search history.

(56) References Cited

U.S. PATENT DOCUMENTS

| | | | |
|---|---|---|---|
| 6,973,537 B1 * | 12/2005 | Kowalchik et al. | 711/129 |
| 7,447,843 B2 * | 11/2008 | Ishikawa et al. | 711/129 |
| 2005/0097275 A1 * | 5/2005 | Korgaonkar | 711/114 |
| 2007/0022143 A1 * | 1/2007 | Trask et al. | 707/200 |
| 2007/0033341 A1 * | 2/2007 | Hashimoto et al. | 711/113 |
| 2007/0050548 A1 * | 3/2007 | Bali et al. | 711/118 |
| 2007/0143546 A1 * | 6/2007 | Narad | 711/130 |
| 2007/0239725 A1 * | 10/2007 | Bhat et al. | 707/10 |

* cited by examiner

*Primary Examiner*—Matt Kim
*Assistant Examiner*—Hal Schnee
(74) *Attorney, Agent, or Firm*—John H. Holcombe

(57) ABSTRACT

Upgrades are made to the available capacity of cache disk storage without adding drawer(s) or blade(s) when the upgrade is requested. A cache control is configured to respond to a requested capacity upgrade, establishing a capacity restriction applicable to a filesystem providing active perceived available capacity spanning the disk drive subunits, such as drawers, blades or disk drives. The active perceived available data storage capacity and unused capacity of the filesystem are spread across the disk drive subunits. The capacity restriction is related to the requested upgrade adjustment, and the capacity restriction controls rates of data transfer with respect to the filesystem. The capacity restriction may comprise a freespace threshold for throttling of a fill rate of resident data pending premigration from the cache disk storage filesystem, and a premigration threshold for increasing drain rate of premigration data from the cache disk storage filesystem.

35 Claims, 4 Drawing Sheets

_US 7,600,073 B2_

CACHE DISK STORAGE UPGRADE

DOCUMENT INCORPORATED BY REFERENCE

Commonly assigned U.S. Pat. No. 5,926,834 is incorporated for its showing of a system configured to employ thresholds for adaptively throttling rates of data transfer with respect to a data storage cache.

FIELD OF THE INVENTION

This invention relates to cache disk storage, and more particularly to upgrades to cache disk storage capacity.

BACKGROUND OF THE INVENTION

Cache disk storage provides a means for storing data that is being migrated, for example, from a host system, to long term storage, for example, to magnetic tape. Data stored in cache disk storage is available for short term access by the migrating system, and is typically initially resident in cache disk storage, and then is premigrated, or copied to magnetic tape, so that the data is in two locations, the cache disk storage and the magnetic tape. Ultimately, the copy in cache disk storage is allocated to freespace and made available to be overwritten by new data, completing the migration.

Cache disk storage typically comprises a plurality of disk drives, and may take the form of one or more "drawers" or "blades" of a plurality of disk drives each, for example, as a RAID (Redundant Array of Independent Disks) or as a JBOD (Just a Bunch of Disks).

Eventually, the capacity of the cache disk storage needs to be increased, and this is typically accomplished by adding a drawer or blade to the cache disk storage, requiring a time consuming reconfiguration of the filesystem in accordance with the new capacity.

After the reconfiguration, the existing data is typically on the original drawer(s) or blade(s), and the added drawer or blade is empty. This means that new data is likely to be placed in the added drawer or blade, and not the original drawer(s) or blade(s), limiting throughput. Data is premigrated from the original drawer(s) or blade(s). When the added drawer or blade reaches capacity, new data is likely to be placed in the freespace of the original, and data is premigrated from the added drawer or blade, and a cyclic data transfer process continues, thereby affecting the cache disk storage data throughput.

SUMMARY OF THE INVENTION

Cache disk storage, cache controls, and service methods provide upgrades to the available capacity of cache disk storage without adding drawer(s) or blade(s) when the upgrade is requested.

In one embodiment, cache disk storage comprises a plurality of disk drive subunits configured to store data, such as drawers, blades or individual disk drives. Each disk drive subunit has a maximum capacity, and the sum of the disk drive subunits comprising a cache maximum capacity. A cache control is configured to respond to a requested upgrade adjustment of available capacity of the cache disk storage, the cache control establishing a capacity restriction applicable to a filesystem providing active perceived available capacity spanning the plurality of disk drive subunits, the perceived available capacity of each subunit is substantial proportion to the disk drive subunit maximum capacity as with respect to the relationship between the total amount of active perceived available capacity of data storage provided by the filesystem in the cache disk storage and the cache maximum capacity. The capacity restriction is related to the requested upgrade adjustment, and the capacity restriction controls rates of data transfer with respect to the filesystem.

In a further embodiment, the capacity restriction comprises a freespace threshold for throttling of a fill rate of resident data pending premigration from the cache disk storage filesystem, and a premigration threshold for increasing drain rate of premigration data from the cache disk storage filesystem.

In a still further embodiment, the freespace threshold is directly related to the active perceived available capacity of the cache disk storage.

In another embodiment, the premigration threshold is related to the active perceived available capacity of the cache disk storage.

In still another embodiment, the premigration threshold is independent of the upgrade adjustment.

In a further embodiment, the cache control is configured to respond to a requested upgrade adjustment in specified increments of active perceived available capacity of the cache disk storage.

In another embodiment, the cache disk storage comprises a plurality of disk drive subunits configured to store data; and a cache control configured to periodically count a requested level of increments of available capacity of the cache disk storage, and determine whether there is a change from a current requested level of increments. Upon determining a change of requested level of increments, the cache control is configured to change a capacity restriction applicable to a filesystem spanning the plurality of disk drive subunits, the filesystem such that the active perceived available data storage capacity and unused capacity of the filesystem are spread across the plurality of disk drive subunits. The capacity restriction is related to the requested level of increments, and the capacity restriction controlling rates of data transfer with respect to the filesystem.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
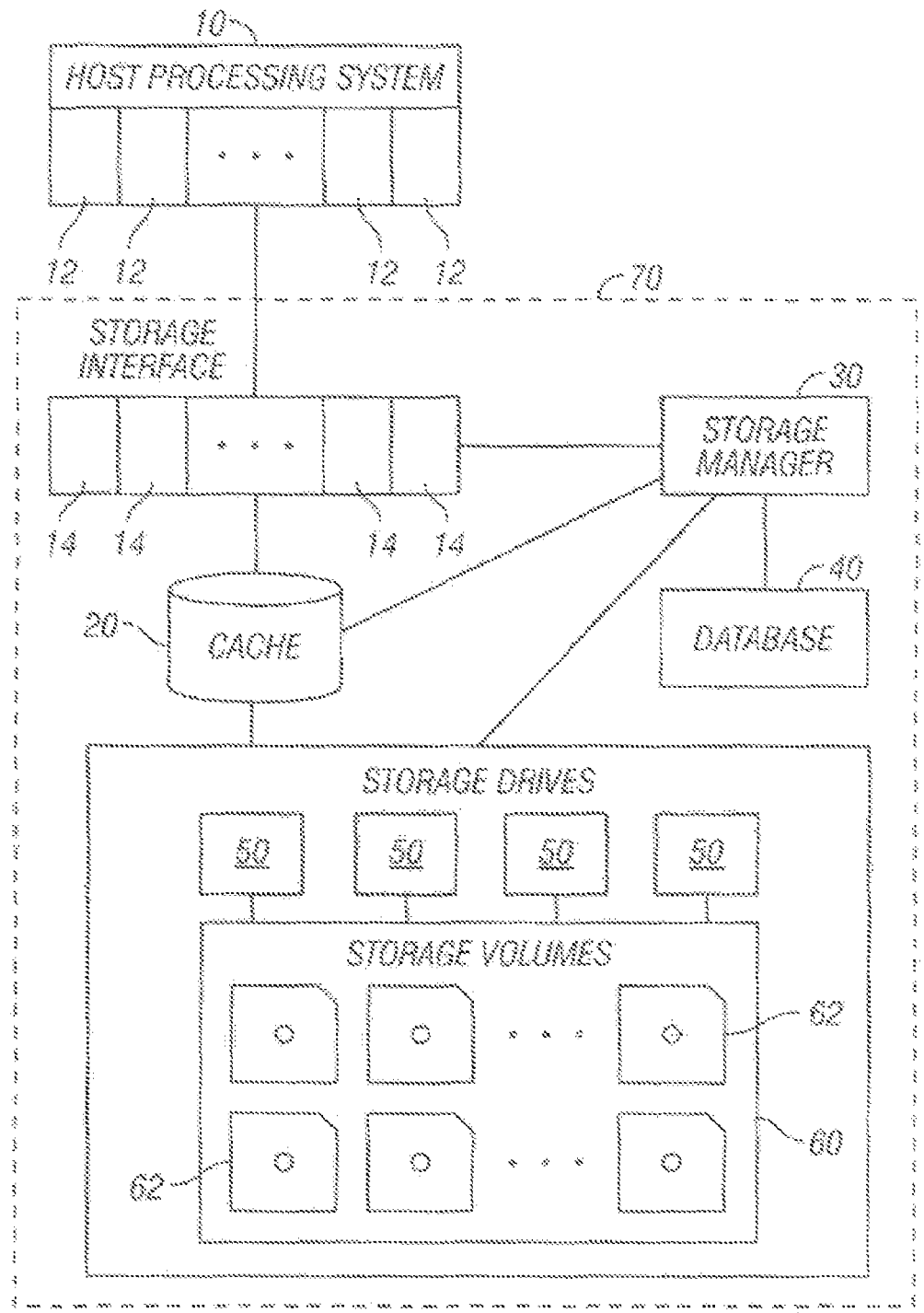
FIG. 1 is a block diagram showing a cache disk storage in a data storage system, which cache disk storage may implement the present invention.

Referring to FIG. 1, a data storage system 70 is illustrated in communication with a host system 10. An example of a data storage system 70 that may be operated in accordance with the present invention comprises the IBM® 3494 Virtual Tape Storage System. Typically, the host system 10, which may comprise one or more host processors, and may comprise a network, as is known to those of skill in the art, generates data to be stored by the data storage system 70. The data storage system comprises, for example, a storage manager, or storage control, 30 in communication with a storage interface 14, cache disk storage 20, database storage 40, and a library, or storage subsystem 60 having a number of storage volumes 62 and drive devices 50. The storage volumes 62 may comprise data storage cartridges, for example, of magnetic tape or optical disks, and may comprise virtual volumes, a plurality of which are stored on a single data storage cartridge.

The data storage system 70 may comprise a virtual data storage system which appears to the host system 10 as multiple storage devices, each with a unique address 12, as is known to those of skill in the art. The storage interface 14 and the storage manager 30 may provide data paths 14 for each of the virtual devices 12, and the storage manager tracks data stored to the virtual devices, also as is known to those of skill in the art. The storage manager directs data files to the cache disk storage 20 and the data files are eventually migrated to selected physical storage volumes 62 in the library 60.

Data files through three stages in the data storage system 70: 1) resident files, data files stored only in the cache disk storage 20; 2) premigrated files, data files stored in the cache storage 20 and copied to a selected storage volume 62; and 3) migrated files, whose copy in cache disk storage is allocated to freespace and made available to be overwritten by new data, such that the data files are stored only on a storage volume 62. The storage manager 30 controls the initial premigration and eventual migration of data files from the cache disk storage 20 to the library 60. The storage manager 30 also maintains reference information and virtual and physical volume location information about premigrated and migrated files with database storage 40. When the host system 10 requests a data file from the data storage system 70, resident and premigrated files are accessed from their location in the cache disk storage 20. Migrated files are recalled from their location in the library 60 to the cache disk storage 20 and accessed by the host system 10 through the cache disk storage 20. Thus, write operations and recall operations insert data files into the cache disk storage 20, while migration operations remove data files from the cache disk storage 20.

Figure 2:
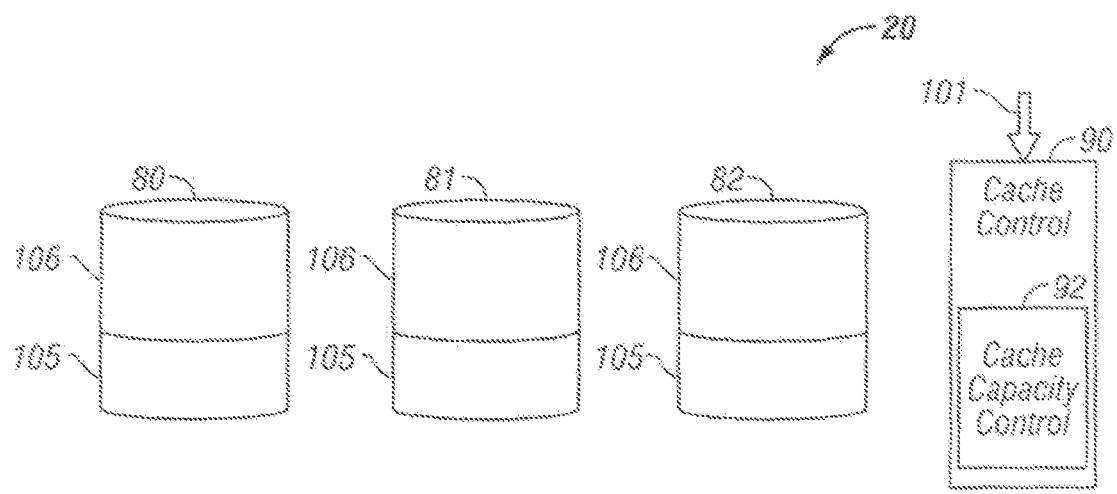
FIG. 2 is a diagrammatic illustration of the cache disk storage of FIG. 1 having a plurality of disk storage subunits, at one level of available capacity of active data storage.
Figure 3:
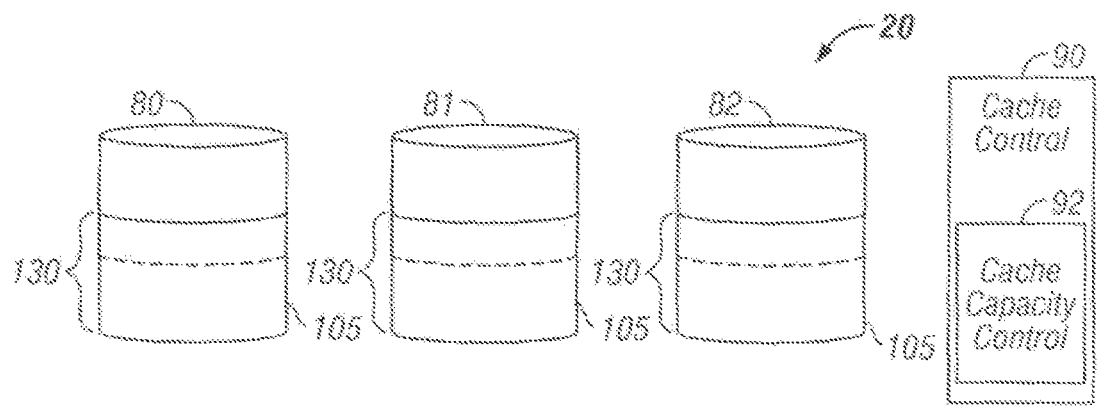
FIG. 3 is a diagrammatic illustration of the cache disk storage having the plurality of disk storage subunits of FIG. 2, showing an upgrade in active perceived available data storage capacity.
Figure 4:
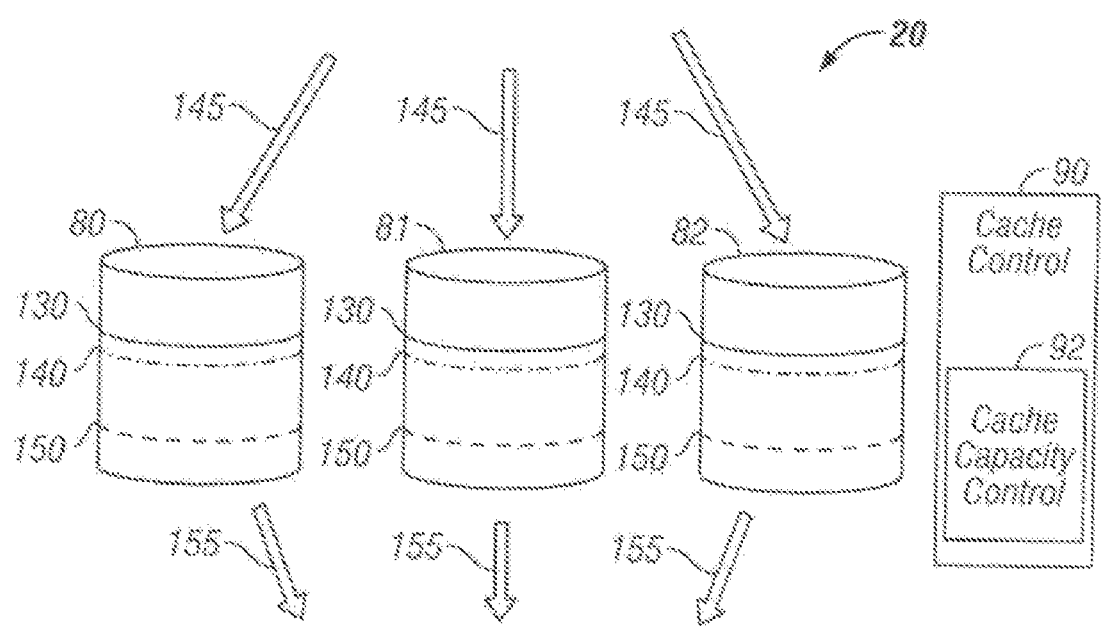
FIG. 4 is a diagrammatic illustration of the cache disk storage of FIG. 3, portraying capacity restrictions of the present invention.

The cache disk storage 20 is illustrated in FIGS. 2, 3, and 4, and comprises a plurality of disk storage subunits 80, 81 and 82, such as drawers of disk drives and supporting electronics, such as blades of one or more disk drives, or such as individual disk drives or groups of disk drives. Such disk storage subunits may comprise a plurality of disk drives each, for example, as a RAID (Redundant Array of Independent Disks) or as a JBOD (Just a Bunch of Disks), as are known to those of skill in the art. Various numbers of disk storage subunits may comprise the cache disk storage 20.

The cache disk storage 20 further comprises a cache control 90, which incorporates a cache capacity control 92. Herein, "cache control" may comprise any suitable logic, microprocessor, and associated memory and/or data storage for responding to program code, and the associated memory and/or data storage may comprise fixed or rewritable memory or data storage devices. The "cache capacity control" may comprise program code within the program code of cache control 90, or may comprise an application employed by the cache control 90. Referring additionally to FIG. 1, the program code may be supplied to the cache control directly as from a data storage device or memory, for example by an input from an optical disk or floppy disk, for example at an operator panel or drive of the data storage system 70, or by being read from a magnetic tape cartridge, for example at a drive device 50, or from a network, for example via host system 10, or by any other suitable means. The cache control 90 may be located in the cache disk storage 20, but may be physically located at the storage manager 30 or any point in the data storage system 70, or spread across the library or the system.

Referring to FIGS. 2, 3, 4 and 5, eventually, the host system increases the amount of data that is handled and needs to be migrated, and, as the result, the user may request in step 100 that the capacity of the cache disk storage be increased and post that request, for example, at an input 101. Typically, in the prior art, the request is made by means of a service call requesting that one or more drawers or blades be added to the system, and the system must be reconfigured resulting in downtime, and resulting in the cyclic nature of the processing of the data through the cache disk storage as discussed above.

As shown in FIG. 2, the cache control 92 provides a filesystem spanning the plurality of disk drive subunits 80, 81 and 82. The filesystem is such that the active perceived available data storage capacity 105 and unused and unavailable capacity 106 of the filesystem are spread across the plurality of disk drive subunits 80, 81 and 82.

As an example, each disk drive subunit 80, 81 and 82 has a maximum capacity, and the sum of the disk drive subunits comprises a cache maximum capacity. The filesystem provides active perceived available capacity 105 spanning the plurality of disk drive subunits, the perceived available capacity of each subunit is substantial proportion to the disk drive subunit maximum capacity as with respect to the relationship between the total amount of active perceived available capacity of data storage provided by the filesystem in the cache disk storage and the cache maximum capacity.

Figure 5:
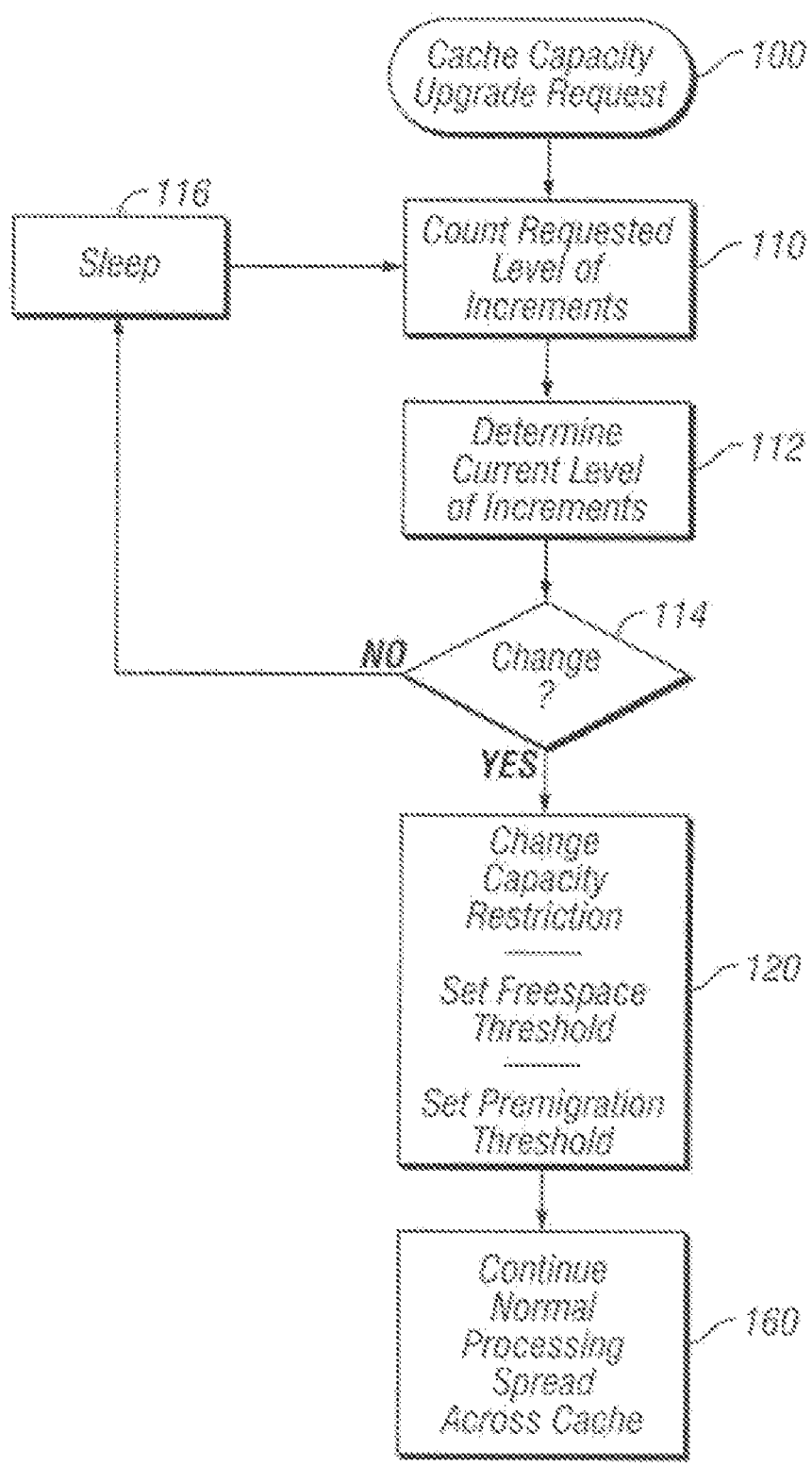
FIG. 5 is a flow chart depicting the functions of the cache control of FIGS. 2, 3, and 4.

As shown in FIGS. 3 and 5, handling a change to the available capacity is made relatively seamlessly. The cache capacity control 92 of cache control 90 is configured to respond to a requested upgrade adjustment of available capacity of the cache disk storage, for example, in step 110, periodically counting a requested level of increments of available capacity of the cache disk storage; in step 112, determining the current requested level of increments; and, in step 114, determining whether there is a change from the current requested level of increments.

The increments need not be the capacity of a drawer, blade or disk drive, but, instead the cache control may be configured to respond to a requested upgrade adjustment in specified increments of active perceived available capacity of the cache disk storage, which comprise any suitable indication of quantity, for example, in 4 gigabyte increments.

As part of the request 100, a signal may be sent to the supplier of the cache disk storage 20 to increase the lease rate to include the added capacity, or to invoice the sale price of the added capacity.

If there is not change to the current requested capacity, the cache capacity control returns to a sleep step 116, for example, to sleep for a 7 minute period before again conducting steps 110, 112 and 114.

If step 114 indicates there is a change, the cache capacity control 92, in step 120, establishes a capacity restriction applicable to the filesystem of cache control 90 providing a new active perceived available capacity 130 spanning the plurality of disk drive subunits 80, 81 and 82. The new active perceived available capacity 130 is also spread across the disk drive subunits. In one example, the new perceived available capacity spans the disk drive subunits 80, 81 and 82, each in substantial proportion to the disk drive maximum capacity as with respect to the relationship between the total amount of active perceived available capacity of data storage provided by the filesystem in the cache disk storage and the cache maximum capacity. The capacity restriction is related to the requested upgrade adjustment, for example, the new active perceived available capacity 130 differs from the current (now previous) capacity 105 by the amount of the upgrade.

Referring to FIGS. 4 and 5, the capacity restriction is related to the requested upgrade adjustment, and the capacity restriction controls rates of data transfer with respect to the filesystem. Thus, the new capacity need not be an absolute capacity level, and instead the capacity restriction limits the rate of incoming data when the capacity level is neared, and may increase the rate of outgoing or premigrated data. Hence, herein, the capacity is called "active perceived available capacity".

For example, the step 120 capacity restriction comprises setting a freespace threshold for throttling of a fill rate of resident data pending premigration from the cache disk storage filesystem, and may also comprise setting a premigration threshold for increasing drain rate of premigration data from the cache disk storage filesystem. Premigrating data so that it is stored at the storage volumes 62 of FIG. 1 allows a migration algorithm of the cache control filesystem to allocate the space of the data in the cache to freespace and make the space available to be overwritten by new data. Examples of migration algorithms are known to those of skill in the art.

The freespace threshold 140 is directly related to the active perceived available capacity 130 of the cache disk storage, for example, the threshold could be set at 95 percent of the active perceived available capacity. Thus, when the total data stored by the cache disk storage as both resident and premigrated data reaches 95 percent of the active perceived available capacity 130 of the cache disk storage (or the freespace is at 5 percent or less), the freespace threshold 140 restricts the rate of incoming data 145, as discussed by the incorporated U.S. Pat. No. 5,926,834.

The premigration threshold 150 may be related to or independent of the active perceived available capacity of the cache disk storage. In one example, the threshold could be set at 45 percent of the available capacity 130 of the cache disk storage, meaning that at least 45 percent of the active perceived available capacity should be premigrated data. Thus, when the total premigrated data drops to or under 45 percent of the active perceived available capacity 130 of the cache disk storage (or the freespace and resident data are at 55 percent or more), the premigration threshold 150 increases the rate of outgoing data 155 to increase the premigration. Alternatively, the premigration threshold may be related to the active perceived available capacity of the cache disk storage in another way, for example, the threshold is set based on the amount of resident data, for example, at 50 percent of the of the available capacity 130 of the cache disk storage, meaning that no more than 50 percent of the active perceived available capacity should be resident data that has not been premigrated. Thus, when the total resident data reaches or exceeds 50 percent of the active perceived available capacity 130 of the cache disk storage, the premigration threshold 150 increases the rate of outgoing data 155. This increase in the rate of outgoing data can be achieved by restricting the rate of incoming data 145, as discussed by the incorporated U.S. Pat. No. 5,926,834.

Alternatively, the premigration threshold 150 is changed by a number of specified increments related to or independent of the upgrade adjustment. For example, if the upgrade is 8 gigabytes, one-half, or 4 gigabytes are added to the premigration threshold 150.

Herein, the term "related to" or similar terms comprise ranges of functional relationships, ranging from a direct proportional relationship function to a non-linear relationship function, and ranging from a smooth relationship function to a stepwise incremented function.

Thus, in another example, in response to the requested upgrade, the premigration threshold is set based on a stepwise linear increase (increase by x for each increment of y), until a preset limit is reached. Alternatively, the premigration threshold is set based on a non-linear increase (increase by x for each increment of y to a preset level of y, and then increase by on-half x for each increment of y).

Still alternatively, the premigration threshold may be set independent of the available capacity or the upgrade adjustment or the resident data, for example, the preset limit discussed above. As another example, the premigration threshold may be wholly or partially based on the number of drive devices 50 of FIG. 1, and partially or not based on the available capacity.

Normal processing of data through the cache disk storage is continued in step 160, and is now accomplished with the increased capacity requested in step 100, without physical change to the cache disk storage. The processing of data is spread across the disk drive subunits 80, 81 and 82 of the cache disk storage 20 similarly to the processing before the capacity was upgraded.

The data of the filesystem is stored across the disk drive subunits 80, 81 and 82. In one example, the data stored by each of the disk drive subunits is in substantial proportion to the subunit's maximum capacity as with respect to the relationship between the total amount of data stored in the cache and the maximum capacity of the sum of the subunits of the cache.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A cache disk storage, comprising:
   a plurality of disk drive subunits configured to store data, and each disk drive subunit having a maximum capacity, the sum of said disk drive subunits comprising a cache maximum capacity; and
   a cache control configured to establish a capacity restriction applicable to a filesystem providing active perceived available capacity spanning said plurality of disk drive subunits, said perceived available capacity of each said disk drive subunit in substantial proportion to said disk drive subunit maximum capacity as with respect to the relationship between the total amount of active perceived available capacity of data storage provided by said filesystem in said cache disk storage and said cache maximum capacity, and to respond to a requested upgrade adjustment of available capacity of said cache disk storage, said cache control establishing a new capacity restriction applicable to said filesystem without adding disk drive subunits, said new capacity restriction providing active perceived available capacity spanning said plurality of disk drive subunits, said perceived available capacity of each said disk drive subunit in substantial proportion to said disk drive subunit maximum capacity as with respect to the relationship between the total amount of active perceived available capacity of data storage provided by said filesystem in said cache disk storage and said cache maximum capacity, said new capacity restriction related to said requested upgrade adjustment, said new capacity restriction controlling rates of data transfer with respect to said filesystem.

2. The cache disk storage of claim 1, wherein said capacity restriction and said new capacity restriction each comprises a freespace threshold for throttling of a fill rate of resident data pending premigration from said cache disk storage filesystem and a premigration threshold for increasing drain rate of premigration data from said cache disk storage filesystem.

3. The cache disk storage of claim 2, wherein each said freespace threshold is directly related to said active perceived available capacity of said cache disk storage.

4. The cache disk storage of claim 3, wherein each said premigration threshold is related to said active perceived available capacity of said cache disk storage.

5. The cache disk storage of claim 3, wherein each said premigration threshold is independent of said upgrade adjustment.

6. The cache disk storage of claim 2, wherein said cache control is configured to respond to a requested upgrade adjustment in specified increments of said active perceived available capacity of said cache disk storage.

7. A cache disk storage, comprising:
a plurality of disk drive subunits configured to store data; and
a cache control configured to establish a capacity restriction applicable to a filesystem spanning said plurality of disk drive subunits, said filesystem such that the active perceived available data storage capacity and unused capacity of said filesystem are spread across said plurality of disk drive subunits, and to periodically count a requested level of increments of available capacity of said cache disk storage, and determine whether there is a change from a current requested level of increments; and upon determining a change of requested level of increments, said cache control is configured to change said capacity restriction applicable to said filesystem spanning said plurality of disk drive subunits without adding disk drive subunits, said changed capacity restriction applicable to said filesystem such that the active perceived available data storage capacity and unused capacity of said filesystem are spread across said plurality of disk drive subunits, said changed capacity restriction related to said requested level of increments, said changed capacity restriction controlling rates of data transfer with respect to said filesystem.

8. The cache disk storage of claim 7, wherein said capacity restriction and said changed capacity restriction each comprises a freespace threshold for throttling of a fill rate of resident data pending premigration from said cache disk storage filesystem and a premigration threshold for increasing drain rate of premigration data from said cache disk storage filesystem.

9. The cache disk storage of claim 8, wherein each said freespace threshold is directly related to said level of increments of active perceived available capacity of said cache disk storage.

10. The cache disk storage of claim 9, wherein each said premigration threshold is related to said level of increments of active perceived available capacity of said cache disk storage.

11. The cache disk storage of claim 9, wherein each said premigration threshold is independent of said change of requested level of increments of available capacity of said cache disk storage.

12. A cache control configured to control the storage of data in a cache disk storage comprising a plurality of disk drive subunits configured to store data; said cache control comprising:
a filesystem configured to store data spanning said plurality of disk drive subunits, said filesystem such that the active perceived available data storage capacity and unused capacity of said filesystem are spread across said plurality of disk drive subunits; and
a cache capacity control configured to establish a capacity restriction applicable to said filesystem and to respond to a requested upgrade adjustment of available capacity of said cache disk storage, said cache capacity control establishing a new capacity restriction applicable to said filesystem without adding disk drive subunits, and said new capacity restriction related to said requested upgrade adjustment, said new capacity restriction controlling rates of data transfer with respect to said filesystem.

13. The cache control of claim 12, wherein said cache capacity control is configured to periodically count a requested level of increments of available capacity of said cache disk storage, and determine whether there is a change from a current requested level of increments; and upon determining a change of requested level of increments, said cache capacity control is configured to change said capacity restriction to said new capacity restriction, said new capacity restriction related to said requested level of increments.

14. The cache control of claim 13, wherein said capacity restriction and said new capacity restriction each comprises a freespace threshold for throttling of a fill rate of resident data pending premigration from said cache disk storage filesystem and a premigration threshold for increasing drain rate of premigration data from said cache disk storage filesystem.

15. The cache control of claim 14, wherein each said freespace threshold is directly related to said active perceived available capacity of said cache disk storage.

16. The cache control of claim 15, wherein each said premigration threshold is related to said active perceived available capacity of said cache disk storage.

17. The cache control of claim 15, wherein each said premigration threshold is independent of said determined change of requested level of increments of available capacity of said cache disk storage.

18. The cache control of claim 12, wherein said filesystem is configured to span said plurality of disk drive subunits, the amount of data stored by each said disk drive subunit in substantial proportion to a disk drive subunit maximum capacity as with respect to the relationship between the amount of data stored by said filesystem in said cache disk storage and the maximum capacity of the sum of said disk drive subunits; and wherein said cache capacity control new capacity restriction is related to said requested upgrade adjustment.

19. The cache control of claim 18, wherein said capacity restriction and said new capacity restriction each comprises a freespace threshold for throttling of a fill rate of resident data pending premigration from said cache disk storage filesystem and a premigration threshold increasing drain rate of premigration data from said cache disk storage filesystem.

20. A computer program product comprising a computer useable medium having computer useable program code stored therein for operating a cache control controlling the storage of data in a cache disk storage comprising a plurality of disk drive subunits configured to store data; said cache control configured to store data as a filesystem; said computer useable program code configured to, when executed on said cache control, cause said cache control to:

establish a capacity restriction applicable to said filesystem, said filesystem spanning said plurality of disk drive subunits such that the active perceived available data storage capacity and unused capacity of said filesystem are spread across said plurality of disk drive subunits;

detect a requested upgrade adjustment of available capacity of said cache disk storage; and establish a new capacity restriction applicable to said filesystem without adding disk drive subunits, said new capacity restriction related to said requested upgrade adjustment, said filesystem spanning said plurality of disk drive subunits such that the active perceived available data storage capacity and unused capacity of said filesystem are spread across said plurality of disk drive subunits, said new capacity restriction controlling rates of data transfer with respect to said filesystem.

21. The computer program product of claim 20, wherein said computer usable program code is configured to, when executed on said cache control, cause said cache control to periodically count a requested level of increments of available capacity of said cache disk storage, and determine whether there is a change from a current requested level of increments; and upon determining a change of requested level of increments, cause said cache control to change said capacity restriction to said new capacity restriction, said new capacity restriction related to said requested level of increments.

22. The computer program product of claim 21, wherein said capacity restriction and said new capacity restriction each comprises a freespace threshold for throttling of a fill rate of resident data pending premigration from said cache disk storage filesystem and a premigration threshold for increasing drain rate of premigration data from said cache disk storage filesystem.

23. The computer program product of claim 22, wherein each said freespace threshold is directly related to said active perceived available capacity of said cache disk storage.

24. The computer program product of claim 23, wherein each said premigration threshold is related to said active perceived available capacity of said cache disk storage.

25. The computer program product of claim 23, wherein each said premigration threshold is independent of said determined change of requested level of increments of active perceived available capacity of said cache disk storage.

26. The computer program product of claim 20, wherein said filesystem is configured to span said plurality of disk drive subunits, the amount of data stored by each said disk drive subunit in substantial proportion to a disk drive subunit maximum capacity as with respect to the relationship between the amount of data stored by said filesystem in said cache disk storage and the maximum capacity of the sum of said disk drive subunits; and wherein said cache control new capacity restriction is related to said requested upgrade adjustment.

27. The computer program product of claim 26, wherein said capacity restriction and said new capacity restriction each comprises a freespace threshold for throttling of a fill rate of resident data pending premigration from said cache disk storage filesystem and a premigration threshold for increasing drain rate of premigration data from said cache disk storage filesystem.

28. A service method of increasing active perceived data storage capacity of a cache disk storage comprising a plurality of disk drive subunits configured to store data, said data stored as a filesystem; comprising the steps of:

establishing a capacity restriction applicable to said filesystem, said filesystem spanning said plurality of disk drive subunits such that the active perceived available data storage capacity and unused capacity of said filesystem are spread across said plurality of disk drive subunits;

detecting a requested upgrade adjustment of available capacity of said cache disk storage; and establishing a new capacity restriction applicable to said filesystem without adding disk drive subunits, said filesystem spanning said plurality of disk drive subunits such that the active perceived available data storage capacity and unused capacity of said filesystem are spread across said plurality of disk drive subunits, said new capacity restriction related to said requested upgrade adjustment, and said new capacity restriction controlling rates of data transfer with respect to said filesystem.

29. The service method of claim 28, wherein:

said step of detecting said upgrade adjustment comprises periodically count a requested level of increments of available capacity of said cache disk storage, and determining whether there is a change from a current requested level of increments; and upon determining a change of requested level of increments, initiating said establishing said new capacity restriction step; and said establishing said new capacity restriction step comprises changing said capacity restriction, said capacity restriction related to said requested level of increments.

30. The service method of claim 29, wherein said new capacity restriction comprises a freespace threshold for throttling of a fill rate of resident data pending premigration from said cache disk storage filesystem and a premigration threshold increasing drain rate of premigration data from said cache disk storage filesystem.

31. The service method of claim 30, wherein said freespace threshold is directly related to said active perceived available capacity of said cache disk storage.

32. The service method of claim 31, wherein said premigration threshold is related to said active perceived available capacity of said cache disk storage.

33. The service method of claim 31, wherein said premigration threshold is independent of said determined change of requested level of increments of active perceived available capacity of said cache disk storage.

34. The service method of claim 28, wherein said filesystem is configured to span said plurality of disk drive subunits, the amount of data stored by each said disk drive subunit in substantial proportion to a disk drive subunit maximum capacity as with respect to the relationship between the amount of data stored by said filesystem in said cache disk storage and the maximum capacity of the sum of said disk drive subunits; and wherein said cache control new capacity restriction is related to said requested upgrade adjustment.

35. The service method of claim 34, wherein said capacity restriction and said new capacity restriction each comprises a freespace threshold for throttling of a fill rate of resident data pending premigration from said cache disk storage filesystem and a premigration threshold for increasing drain rate of premigration data from said cache disk storage filesystem.

* * * * *